(12) United States Patent
Kaneda

(10) Patent No.: US 7,823,614 B2
(45) Date of Patent: Nov. 2, 2010

(54) PNEUMATIC TIRE

(75) Inventor: Kazunori Kaneda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 485 days.

(21) Appl. No.: 11/720,625

(22) PCT Filed: Nov. 30, 2005

(86) PCT No.: PCT/JP2005/021959

§ 371 (c)(1),
(2), (4) Date: Jun. 1, 2007

(87) PCT Pub. No.: WO2006/062015

PCT Pub. Date: Jun. 15, 2006

(65) Prior Publication Data

US 2009/0229728 A1    Sep. 17, 2009

(30) Foreign Application Priority Data

Dec. 8, 2004 (JP) .............................. 2004-355334
Jul. 12, 2005 (JP) .............................. 2005-202716

(51) Int. Cl.
B60C 1/00 (2006.01)
B60C 9/02 (2006.01)
B60C 9/18 (2006.01)

(52) U.S. Cl. ...................... 152/450; 152/526; 152/537; 152/548; 152/564

(58) Field of Classification Search .................. 152/564, 152/450, 526, 537, 548
See application file for complete search history.

(56) References Cited

FOREIGN PATENT DOCUMENTS

| JP | 53-273378 | * | 3/1978 |
|---|---|---|---|
| JP | 54-52188 | * | 4/1979 |
| JP | 55-152730 A | | 11/1980 |
| JP | 7-118621 A | | 5/1995 |
| JP | 2001-234140 A | | 8/2001 |
| JP | 2002-338739 A | | 11/2002 |
| JP | 2004-82878 A | | 3/2004 |
| JP | 2004-83766 A | | 3/2004 |
| JP | 2005-290373 A | | 10/2005 |

* cited by examiner

*Primary Examiner*—Justin Fischer
(74) *Attorney, Agent, or Firm*—Sughrue Mion, PLLC

(57) ABSTRACT

This invention relates to a pneumatic tire wherein at least one of a carcass (4) and a belt (6) comprises a layer of steel cords covered with a coating rubber, and as the coating rubber covering the steel cords in at least one of the carcass (4) and the belt (6) is used a rubber composition comprising a rubber component (A), 1-10 parts by mass of sulfur (B) and 0.1-10 parts by mass of a compound (C) including a substituted benzene ring, a compound (D1) having a particular structure or a composition (D2) consisting essentially of such a compound based on 100 parts by mass of the rubber component, and as the steel cord is used a steel cord formed by twisting a plurality of steel wires each plated on its peripheral face with a brass and having an amount of phosphorus as an oxide in a surface layer region from a surface of the plated brass to a depth of 5 nm inward in a radial direction of the wire controlled to not more than 1.5 atomic %.

8 Claims, 1 Drawing Sheet

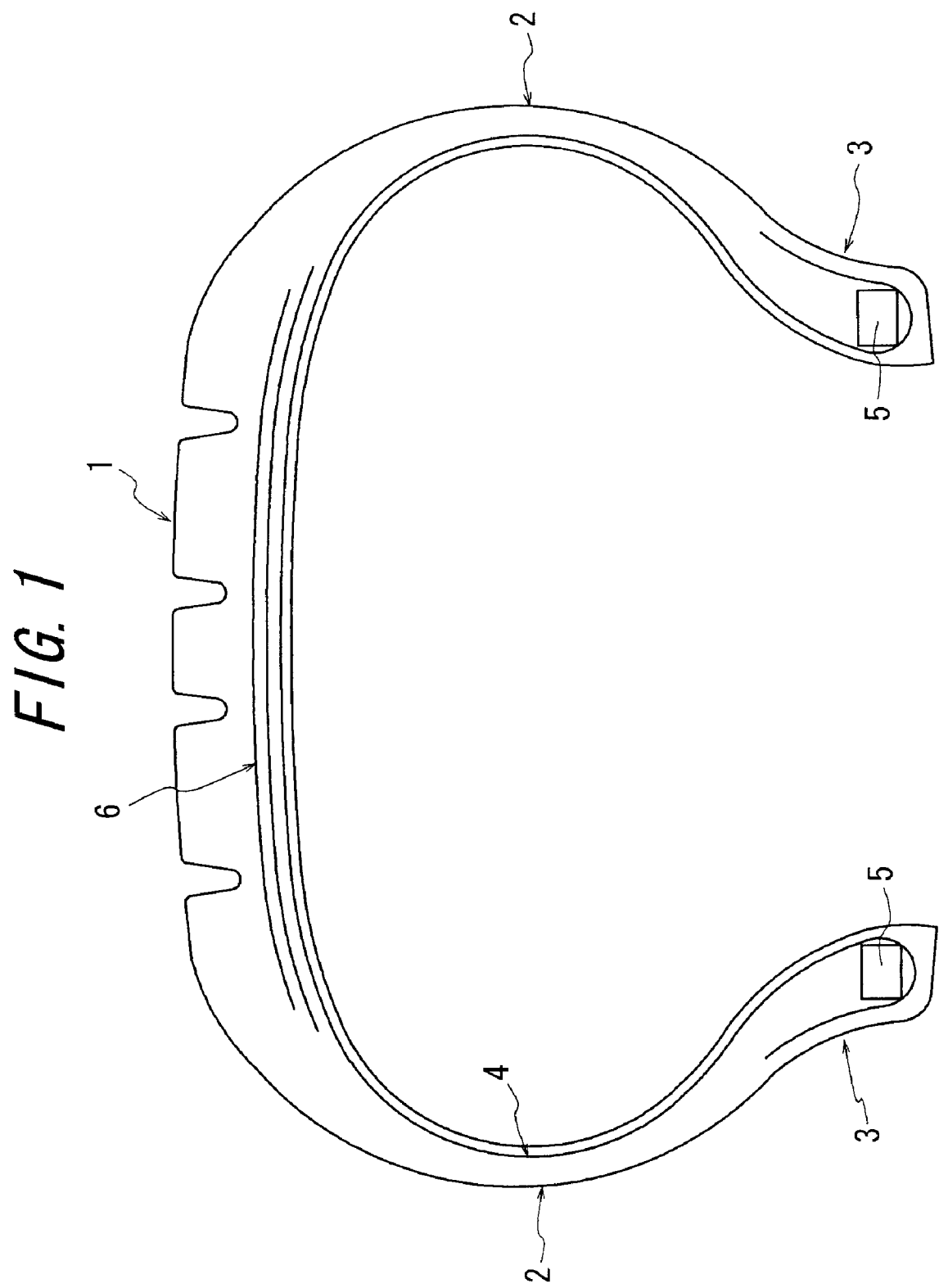

PNEUMATIC TIRE

TECHNICAL FIELD

This invention relates to a pneumatic tire and more particularly to a pneumatic tire wherein an initial adhesion property between steel cords and a coating rubber in at least one of a carcass and a belt when at least one carcass ply of the carcass and/or at least one belt layer of the belt is formed by a steel cord layer, preferably an initial adhesion property and an adhesion stability are improved and the humidity aged adhesion is suppressed to improve a durability.

RELATED ART

Since steel radial tires have been developed by Michelin SCA at the late 1940's, the share of steel cord-reinforced pneumatic tires using steel cords as a reinforcing member in at least one of a carcass and a belt extends steadily. Lately, the share of the steel cord-reinforced pneumatic tires is considerably extended with the transition to belted bias tires and radial tires, and also the application to trucks is drastically enlarged.

On the other hand, the performances required in tires for automobiles become increasingly severer and hence it is desired to further improve the durability of the tire. In the steel cord-reinforced pneumatic tire, it is important to ensure the adhesion between the steel cord and a coating rubber covering the cord. It is known that as the adhesion property is deteriorated, the durability in at least one of the carcass and the belt is deteriorated to cause a problem in the durability of the tire. Therefore, there are made various investigations for improving the adhesion property between the steel cord and the coating rubber to prolong the service life of the tire.

For example, as the investigation on the coating rubber is known a technique wherein an adhesion rubber composition compounded with resorcin or resorcin-formaldehyde resin obtained by condensing resorcin and formaldehyde (hereinafter referred to as "RF resin") is used as a coating rubber (see JP-A-2001-234140), and there is known that the resistance to humidity aged adhesion between the steel cord and the coating rubber is dramatically improved by compounding resorcin or the RF resin. Also, there is reported an adhesion material made from a mixed polyester having a resorcin skeleton with a weight average molecular weight of 3000-45000 (see JP-A-H07-118621), and in this case the mixed polyester having a large molecular weight has a merit that the compatibility with rubber is good as compared with the RF resin.

Further, in order to vulcanization-build the tire in a constant time, it is necessary to ensure an adhesion rate between the steel cord and the coating rubber or a sufficient adhesive force based on the complete bonding therebetween, i.e. an initial adhesion property between the steel cord and the coating rubber. That is, the improvement of the initial adhesion property leads to the shortening of the vulcanization time and also leads to the reduction of the tire production cost. On the other hand, as the investigation on the steel cord for improving the initial adhesion property between the steel cord and the coating rubber are proposed plural techniques focusing attention on a phosphorus content on the surface of the steel cord (see JP-A-H06-49783, WO97/2331, JP-A-2003-342883, JP-A-2003-313788, JP-A-2003-301391 and WO2002/066732). According to these techniques, the amount of an expensive adhesion promoter compounded into the coating rubber such as a cobalt salt of an organic acid or the like for generally improving the initial adhesion property can be decreased and hence there is obtained a merit that the compounding cost can be decreased.

DISCLOSURE OF THE INVENTION

However, when the adhesion rubber composition disclosed in JP-A-2001-234140 is used as a coating rubber for usual steel cords, the initial adhesion property between the steel cord and the coating rubber is insufficient, while when steel cords disclosed in WO97/23311 are coated with the rubber composition for usual coating rubber, the resistance to humidity aged adhesion between the steel cord and the coating rubber is insufficient. Therefore, in order to achieve the further prolonging the tire service life, it is required to develop the technique for simultaneously and highly improving the initial adhesion property and resistance to humidity aged adhesion, more preferably the technique for simultaneously and highly the initial adhesion property, resistance to humidity aged adhesion and adhesion stability. Also, resorcin or RF resin is very high in the polarity and poor in the compatibility with rubber, and the precipitation of resorcin or RF resin or so-called blooming is caused in accordance with conditions such as mixing, compounding, storing and the like, so that there is caused a fear of damaging the appearance of rubber articles. Furthermore, a problem of deteriorating the adhesion property when the rubber composition is stored over a long period ranging from the compounding to the vulcanization adhesion is caused due to the blooming, so that it is required to rapidly vulcanization-adhere the rubber composition compounded with resorcin or RF resin, which may damage the productivity of the rubber article. On the other hand, in the mixed polyester having a large molecular weight as disclosed in JP-A-H07-118621, the compatibility with rubber is improved as compared with the RF resin but is not completely satisfied, and further when the mixed polyester having a large molecular weight is compounded into rubber, there are problems that the viscosity of the compounded rubber rises and the processability is deteriorated and the resistance to humidity aged adhesion is insufficient. For this end, it is desired to use a coating rubber having excellent initial adhesion property and resistance to humidity aged adhesion against steel cords and hardly causing the blooming and being low in the viscosity and excellent in the processability.

It is, therefore, an object of the invention to solve the above problems of the conventional techniques and to provide a pneumatic tire in which at least a part of a carcass and a belt comprises a steel cord-rubber composite highly establishing the initial adhesion property between steel cord and coating rubber and resistance to humidity aged adhesion or a steel cord-rubber composite improving the initial adhesion property between steel cord and coating rubber, resistance to humidity aged adhesion and adhesion stability and it is possible to shorten the vulcanization time and the durability is excellent.

The inventor has made various studies in order to achieve the object and found that the initial adhesion property between steel cord and coating rubber and the resistance to humidity aged adhesion are largely improved by using a rubber composition containing a compound with a particular substituted benzene ring as a coating rubber and using steel cords formed by twisting a plurality of steel wires having a phosphorus amount in a surface layer region decreased to a particular range as a steel cord to be adhered, or the initial adhesion property between steel cord and coating rubber, the resistance to humidity aged adhesion and the adhesion stability are largely improved by using the rubber composition containing the compound of the specified structure or a composition consisting essentially of such a compound as a coating rubber and using steel cords formed by twisting a plurality of steel wires having a phosphorus amount in a surface layer region decreased to a particular range as a steel cord to be adhered, and as a result, the invention has been accomplished.

That is, the pneumatic tire according to the invention is a pneumatic tire comprising a carcass comprised of one or more carcass plies and a belt disposed on an outside of the carcass in a radial direction of the tire and comprised of one or more belt layers, in which at least one of the carcass and the belt including a layer of steel cords covered with a coating rubber, characterized in that as a coating rubber covering steel cords in at least one of the carcass and the belt is used a rubber composition comprising a rubber component (A), 1-10 parts by mass of sulfur (B) and 0.1-10 parts by mass of a compound (C) including a di-substituted or tri-substituted benzene ring having at least one hydroxy group as a substituent based on 100 parts by mass of the rubber component, and as the steel cord is used a steel cord formed by twisting a plurality of steel wires each plated on its peripheral face with a brass and having an amount of phosphorus as an oxide in a surface layer region from a surface of the plated brass to a depth of 5 nm inward in a radial direction of the wire controlled to not more than 1.5 atomic %.

In a preferable embodiment of the pneumatic tire according to the invention, the compound including the substituted benzene ring is represented by the following general formula (I):

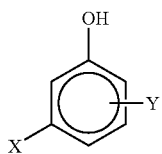

(I)

[wherein X is hydroxy group, carboxyl group or —COOC$_m$H$_{2m+1}$ (wherein m is an integer of 1-5), and Y is existent on 2-site, 4-site, 5-site or 6-site and is hydrogen, hydroxy group or a substituent represented by the following general formula (II):

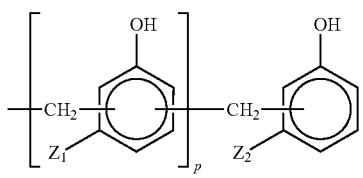

(II)

wherein Z$_1$ and Z$_2$ are independently hydroxy group, carboxyl group or —COOC$_q$H$_{2q+1}$ (wherein q is an integer of 1-5) and p is an integer of 1-7].

Also, the pneumatic tire according to the invention is a pneumatic tire comprising a carcass comprised of one or more carcass plies and a belt disposed on an outside of the carcass in a radial direction of the tire and comprised of one or more belt layers, in which at least one of the carcass and the belt including a layer of steel cords covered with a coating rubber, characterized in that as a coating rubber covering steel cords in at least one of the carcass and the belt is used a rubber composition comprising a rubber component (A), 1-10 parts by mass of sulfur (B) and 0.1-10 parts by mass of a compound (D1) represented by the following general formula (III):

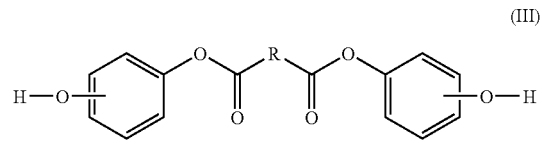

(III)

[wherein R is a bivalent aliphatic group having a carbon number of 1-16 or a bivalent aromatic group] based on 100 parts by mass of the rubber component, and as the steel cord is used a steel cord formed by twisting a plurality of steel wires each plated on its peripheral face with a brass and having an amount of phosphorus as an oxide in a surface layer region from a surface of the plated brass to a depth of 5 nm inward in a radial direction of the wire controlled to not more than 1.5 atomic %.

In a preferable embodiment of the pneumatic tire according to the invention, the compound represented by the general formula (III) is a compound represented by the following general formula (IV):

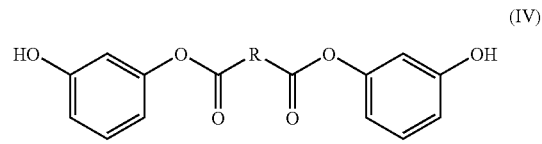

(IV)

[wherein R is a bivalent aliphatic group having a carbon number of 1-16 or a bivalent aromatic group].

Further, the other pneumatic tire according to the invention is a pneumatic tire comprising a carcass comprised of one or more carcass plies and a belt disposed on an outside of the carcass in a radial direction of the tire and comprised of one or more belt layers, in which at least one of the carcass and the belt including a layer of steel cords covered with a coating rubber, characterized in that as a coating rubber covering steel cords in at least one of the carcass and the belt is used a rubber composition comprising a rubber component (A), 1-10 parts by mass of sulfur (B) and 0.1-10 parts by mass of a composition (D2) (provided that the composition does not contain 100% by mass of a pure substance as the compound of the general formula (IV)) comprising 60-100% by mass of a compound represented by the above general formula (IV), 0-20% by mass of a compound represented by the following general formula (V) and n=2, 0-10% by mass of a compound represented by the following general formula (V) and n=3 and 0-10% by mass in total of compounds represented by the following general formula (V) and n=4-6:

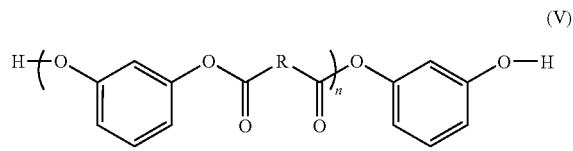

(V)

[wherein R is a bivalent aliphatic group having a carbon number of 1-16 or a bivalent aromatic group and n is an integer of 2-6] based on 100 parts by mass of the rubber component, and as the steel cord is used a steel cord formed by twisting a plurality of steel wires each plated on its peripheral face with a brass and having an amount of phosphorus as an oxide in a surface layer region from a surface of the plated brass to a depth of 5 nm inward in a radial direction of the wire controlled to not more than 1.5 atomic %.

In the pneumatic tire according to the invention, the rubber composition used as the coating rubber is preferable to further contain a cobalt salt of an organic acid in an amount as cobalt content of 0.03-1 part by mass based on 100 parts by mass of the rubber component.

In the pneumatic tire according to the invention, the rubber component in the rubber composition used as the coating rubber is preferable to be at least one of natural rubber (NR) and polyisoprene rubber (IR). Also, in the pneumatic tire according to the invention, the rubber component in the rubber composition used as the coating rubber is preferable to comprise not less than 50% by mass of natural rubber and the reminder being the synthetic rubber.

According to the invention, there can be provided a pneumatic tire being in the shortening of a vulcanization time and having an excellent durability in which a steel cord-rubber composite having high initial adhesion property between steel cord and coating rubber and resistance to humidity aged adhesion by using a rubber composition containing a compound (C) with a particular substituted benzene ring as the coating rubber and using a steel cord made from steel wires having an amount of phosphorus in a surface layer region decreased to a specified range as the steel cord to be adhered is used in the carcass and/or the belt.

Further, according to the invention, there can be provided a pneumatic tire being in the shortening of a vulcanization time and having an excellent durability in which a steel cord-rubber composite having high initial adhesion property between steel cord and coating rubber, resistance to humidity aged adhesion and adhesion stability by using a rubber composition containing a compound (D1) with a particular structure or a composition (D2) consisting essentially of such a compound as the coating rubber and using a steel cord made from steel wires having an amount of phosphorus in a surface layer region decreased to a specified range as the steel cord to be adhered is used in the carcass and/or the belt. Moreover, since the rubber composition used as the coating rubber suppresses the occurrence of the blooming, which was a problem in the rubber composition compounded with resorcin or RF resin, but also is low in the Mooney viscosity and excellent in the processability, the productivity of the pneumatic tire is excellent.

BRIEF DESCRIPTION OF THE DRAWING

FIG. 1 is a section view of an embodiment of the pneumatic tire according to the invention.

BEST MODE FOR CARRYING OUT THE INVENTION

The invention will be described in detail below. FIG. 1 is a cross-sectional view of an embodiment of the invention, wherein numeral 1 is a tread portion, numeral 2 a pair of sidewall portions extending inward from both sides of the tread portion 1 in a radial direction, and numeral 3 a bead portion connecting to an inner end of the sidewall portion 2 in the radial direction.

A carcass 4 forming a skeleton structure of the tire and reinforcing the portions 1, 2, 3 of the tire is comprised of one or more carcass plies, and has a main body portion toroidally extending between a pair of bead cores 5 embedded in the respective bead portions 3 and a turnup portion wound around the bead core 5 from an inside toward an outside in a widthwise direction of the tire and outward in the radial direction. Although the illustrated carcass 4 is comprised one carcass ply, the number of carcass plies may be plural in the tire according to the invention.

Also, numeral 6 is a belt. The belt 6 is comprised of one or more belt layers disposed at an outside of a crown portion of the carcass 4 in the radial direction of the tire. Although the illustrated belt 6 is comprised of two belt layers, the number of belt layers is not limited thereto in the tire according to the invention.

In the pneumatic tire, at least one of the carcass 4 and the belt 6 comprises a layer of steel cords covered with a coating rubber. That is, at least one carcass ply in the carcass 4 and/or at least one belt layer in the belt 6 may be the steel cord layer, or one or more carcass plies and one or more belt layers may be the steel cord layer.

In at least one of the carcass 4 and the belt 6, as a coating rubber covering the steel cord is used a rubber composition comprising a rubber component (A), 1-10 parts by mass of sulfur and 0.1-10 parts by mass of a compound (C) including a di-substituted or tri-substituted benzene ring with at least one hydroxy group as a substituent, a compound (D1) of a particular structure or a composition (D2) consisting essentially of the latter compound, while as the steel cord is used a steel cord formed by twisting a plurality of steel wires each plated on its peripheral face with a brass and having an amount of phosphorus as an oxide in a surface layer region from a surface of the plated brass to a depth of 5 nm inward in a radial direction of the wire controlled to not more than 1.5 atomic %.

By using the rubber composition compounded with the compound (C) including the substituted benzene ring, the compound (D1) of the particular structure or the composition (D2) consisting essentially of the latter compound as the coating rubber can be improved the resistance to humidity aged adhesion between the steel cord and the coating rubber. Also, by using the steel cord made from the steel wires having the reduced amount of phosphorus in surface layer region can be improved the initial adhesion property between the steel cord and the coating rubber. Further, when the rubber composition compounded with the compound (C) including the substituted benzene ring, the compound (D1) of the particular structure or the composition (D2) consisting essentially of the latter compound is used as the coating rubber and the steel cord made from the steel wires having the reduced amount of phosphorus in surface layer region is used, the resistance to humidity aged adhesion between the steel cord and the coating rubber can be largely improved by the synergistic effect. Surprisingly, the synergistic effect for the resistance to humidity aged adhesion is fairly better than a sum of the effect obtained only by using the rubber composition compounded with the compound (C) including the substituted benzene ring, the compound (D1) of the particular structure or the composition (D2) consisting essentially of the latter compound as the coating rubber and the effect obtained only by using the steel cord made from the steel wires having the reduced amount of phosphorus in surface layer region.

The rubber component (A) in the rubber composition for the coating rubber is not particularly limited as long as it shows a rubbery elasticity, but there can be used all well-known rubbers such as natural rubber (NR) and synthetic rubbers, for example, a vinyl aromatic hydrocarbon/conjugated diene copolymer, polyisoprene rubber (IR), polybutadiene rubber (BR), butyl rubber (IIR), a halogenated butyl rubber, ethylene-propylene rubber and so on. The rubber components may be used alone or in a blend of two or more. Since the fracture resistance is required in addition to the adhesion property as the coating rubber for the steel cord, in view of the adhesion property and fracture characteristics, the rubber component is at least one of natural rubber and polyisoprene rubber, and is preferable to comprise not less than 50% by mass of natural rubber and the reminder being the synthetic rubber, and is more preferable to contain not less than 75% by mass of natural rubber. Among the above synthetic rubbers, polyisoprene rubber is preferable.

In the rubber composition for the coating rubber is compounded sulfur (B) as a vulcanizing agent in an amount of 1-10 parts by mass, preferably 3-8 parts by mass based on 100 parts by mass of the rubber component. When the amount of sulfur compounded is less than 1 part by mass, the adhesion property to the steel cord is insufficient, while when it exceeds 10 parts by mass, an excessive adhesion layer is formed to deteriorate the adhesion property.

As the compound (C) including a di-substituted or tri-substituted benzene ring with at least one hydroxy group as a substituent to be compounded in the rubber composition for the coating rubber is preferable a compound represented by the general formula (I). In the formula (I), X is hydroxy group, carboxyl group or —$COOC_mH_{2m+1}$, wherein m is an integer of 1-5. Y may be bonded to any of 2-site, 4-site, 5-site and 6-site of the benzene ring and is hydrogen, hydroxy group or a substituent represented by the general formula (II). In the formula (II), $Z_1$ and $Z_2$ are independently hydroxy group, carboxyl group or —$COOC_qH_{2q+1}$, wherein q is an integer of 1-5, and p is an integer of 1-7. As the compound of the formula (I) are concretely mentioned resorcin, resorcin-formaldehyde resin and the like. The compounds including the substituted benzene ring may be used alone or in a combination of two or more.

The amount of the compound (C) including the substituted benzene ring compounded is within a range of 0.1-10 parts by mass based on 100 parts by mass of the rubber component (A). When the amount of the compound including the substituted benzene ring is less than 0.1 part by mass, the effect of improving the resistance to humidity aged adhesion is low, while when it exceeds 10 parts by mass, the compound is bloomed to deteriorate the adhesion property.

In the compound (D1) represented by the general formula (III) to be compounded in the rubber composition for coating rubber, R is a bivalent aliphatic group having a carbon number of 1-16 or a bivalent aromatic group. As the compound of the general formula (III) is mentioned, for example, a compound represented by the general formula (IV). R in the formula (IV) is the same as R in the formula (III).

As the aliphatic group having a carbon number of 1-16 are mentioned a straight or branched alkylene group such as methylene group, ethylene group, butylene group, isobutylene group, octylene group, 2-ethylhexylene group or the like; a straight or branched alkenylene group such as vinylene group (ethenylene group), butenylene group, octenylene group or the like; alkylene group or alkenylene group in which hydrogen atom in the alkylene group or alkenylene group is replaced with hydroxyl group, amino group or the like; and an alicyclic group such as cyclohexylene group or the like. As the bivalent aromatic group are mentioned a phenylene group which may be substituted, a naphthylene group which may be substituted, and so on. Among them, an alkylene group having a carbon number of 2-10 and phenylene group are preferable considering the easiness of acquisition, and ethylene group, butylene group, octylene group and phenylene group are particularly preferable.

As a concrete example of the compound of the general formula (III) are mentioned bis(2-hydroxyphenyl) malonate, bis(2-hydroxyphenyl) succinate, bis(2-hydroxyphenyl) fumarate, bis(2-hydroxyphenyl) maleate, bis(2-hydroxyphenyl) malate, bis(2-hydroxyphenyl) itaconate, bis(2-hydroxyphenyl) citraconate, bis(2-hydroxyphenyl) adipate, bis(2-hydroxyphenyl) tartrate, bis(2-hydroxyphenyl) azelate, bis(2-hydroxyphenyl) sebacate, bis(2-hydroxyphenyl) cyclohexane dicarboxylate, bis(2-hydroxyphenyl) terephthalate, bis(2-hydroxyphenyl) isophthalate, bis(3-hydroxyphenyl) malonate, bis(3-hydroxyphenyl) succinate, bis(3-hydroxyphenyl) fumarate, bis(3-hydroxyphenyl) maleate, bis(3-hydroxyphenyl) malate, bis(3-hydroxyphenyl) itaconate, bis(3-hydroxyphenyl) citraconate, bis(3-hydroxyphenyl) adipate, bis(3-hydroxyphenyl) tartrate, bis(3-hydroxyphenyl) azelate, bis(3-hydroxyphenyl) sebacate, bis(3-hydroxyphenyl)cyclohexane dicarboxylate, bis(3-hydroxyphenyl) terephthalate, bis(3-hydroxyphenyl) isophthalate, bis(4-hydroxyphenyl) malonate, bis(4-hydroxyphenyl) succinate, bis(4-hydroxyphenyl) fumarate, bis(4-hydroxyphenyl) maleate, bis(4-hydroxyphenyl) itaconate, bis(4-hydroxyphenyl) citraconate, bis(4-hydroxyphenyl) adipate, bis(4-hydroxyphenyl) tartrate, bis(4-hydroxyphenyl) azelate, bis(4-hydroxyphenyl) sebacate, bis(4-hydroxyphenyl)cyclohexane dicarboxylate, bis(4-hydroxyphenyl) terephthalate, bis(4-hydroxyphenyl) isophthalate and the like.

Among them, bis(3-hydroxyphenyl) malonate, bis(3-hydroxyphenyl) succinate, bis(3-hydroxyphenyl) fumarate, bis(3-hydroxyphenyl) maleate, bis(3-hydroxyphenyl) malate, bis(3-hydroxyphenyl) itaconate, bis(3-hydroxyphenyl) citraconate, bis(3-hydroxyphenyl) adipate, bis(3-hydroxyphenyl) tartrate, bis(3-hydroxyphenyl) azelate, bis(3-hydroxyphenyl) sebacate, bis(3-hydroxyphenyl)cyclohexane dicarboxylate, bis(4-hydroxyphenyl) terephthalate and bis(4-hydroxyphenyl) isophthalate are preferable, and particularly bis(3-hydroxyphenyl) succinate, bis(3-hydroxyphenyl) adipate, bis(3-hydroxyphenyl) sebacate, bis(4-hydroxyphenyl) terephthalate and bis(4-hydroxyphenyl) isophthalate are preferable.

The production method for the compound represented by the general formula (III) is not particularly limited, and is produced, for example, by reacting a dicarboxylic acid halide represented by the following general formula (VI):

(VI)

[wherein R is a bivalent aliphatic group having a carbon number of 1-16 or a bivalent aromatic group and X' is a halogen atom] with a compound represented by the following general formula (VII):

(VII)

in the presence or absence of a base.

In the formula (VI), R is the same as in R of the general formula (III), and X' is a halogen atom. As the halogen atom is preferable chlorine atom or bromine atom.

As the compound of the general formula (VI) are mentioned an aliphatic dicarboxylic acid dichloride such as malonic acid dichloride, succinic acid dichloride, fumaric acid dichloride, maleic acid dichloride, gultaric acid dichloride, adipic acid dichloride, suberic acid dichloride, azelaic acid dichloride, sebacic acid dichloride, 1,10-decanedicarboxylic acid dichloride, 1,12-dodecanedicarboxylic acid dichloride, 1,16-hexadecanedicarboxylic acid dichloride or the like; an alicyclic dicarboxylic acid dichloride such as cyclohexanedicarboxylic acid dichloride, cyclohexenedicarboxylic acid dichloride or the like; an aromatic dicarboxylic acid dichloride such as terephthalic acid dichloride, isophthalic acid dichloride or the like; an aliphatic dicarboxylic acid dibromide such as malonic acid dibromide, succinic acid dibromide, fumaric acid dibromide, maleic acid dibromide, gultaric acid dibromide, adipic acid dibromide, suberic acid dibromide, azelaic acid dibromide, sebacic acid dibromide, 1,10-decanedicarboxylic acid dibromide, 1,12-dodecanedicarboxylic acid dibromide, 1,16-hexadecanedicarboxylic acid dibromide or the like; an alicyclic dicarboxylic acid dibromide such as cyclohexanedicarboxylic acid dibromide, cyclohexenedicarboxylic acid dibromide or the like; and an aromatic dicarboxylic acid dibromide such as terephthalic acid dibromide, isophthalic acid dibromide or the like. Among them, malonic acid dichloride, succinic acid dichloride, adipic acid dichloride, azelaic acid dichloride, sebacic acid dichloride, terephthalic acid dichloride, isophthalic acid dichloride, malonic acid dibromide, succinic acid dibromide, adipic acid dibromide, azelaic acid dibromide, sebacic acid dibromide, terephthalic acid dibromide and isophthalic acid dibromide are preferable.

As the compound of the general formula (VII) are mentioned catechol, resorcin and hydroquinone.

As the base used in the reaction between the compound of the general formula (VI) and the compound of the general formula (VII) is usually used an organic base such as pyridine, β-picoline, N-methylmorpholine, dimethylaniline, diethylaniline, trimethylamine, triethylamine, tributylamine or the like.

In the reaction between the compound of the general formula (VI) and the compound of the general formula (VII), a molar ratio of the compound of the general formula (VI) to the compound of the general formula (VII) is usually 1:4-1:30.

In the reaction between the compound of the general formula (VI) and the compound of the general formula (VII), a solvent may be used for the purpose of dissolving starting materials and the like. As to the solvent, the aforementioned organic base may be used as a solvent, or another organic solvent not obstructing the reaction may be used. As such a solvent is mentioned an ether solvent such as dimethyl ether, dioxane or the like.

The reaction between the compound of the general formula (VI) and the compound of the general formula (VII) is usually carried out at a reaction temperature of −20° C.-120° C.

The compound of the general formula (III) obtained by the above reaction can be isolated from the reaction mixture by a well-known method. That is, there are mentioned a method wherein the organic base used in the reaction and the compound of the formula (VII) and the organic solvent when being used in the reaction are distilled off by an operation such as distillation under a reduced pressure or the like and the residue is dried and solidified, a method wherein re-precipitation is carried out by adding a poor solvent for the compound of the formula (III) to the reaction mixture, a method wherein water and an organic solvent not miscible with water are added to the reaction mixture to conduct extraction with an organic layer, and so on. Also, the purification may be carried out by recrystallization, if necessary.

As the poor solvent for the compound of the formula (III) is usually used water. Also, as the organic solvent not miscible with water are used an ester such as ethyl acetate butyl acetate or the like; and a ketone such as methyl isobutyl ketone, diisobutyl ketone or the like.

When resorcin is used as the compound of the general formula (III), there is obtained a composition consisting essentially of the compound represented by the general formula (IV) and comprising the compound of the formula (IV) and the compound of the formula (V).

In the general formula (V), R is the same as in R of the formula (III), and n is an integer of 2-6.

For example, the composition comprising the compound of the formula (IV) and the compound of the formula (V), which is obtained when resorcin is used in the above reaction, usually contains 60-100% by mass of the compound of the formula (IV), 0-20% by mass of the compound of n=2 in the formula (V), 0-10% by mass of the compound of n=3 in the formula (V), and 0-10% by mass in total of the compounds of n=4-6 in the formula (V). It is possible to control these amounts by changing a molar ratio of the compound of the formula (IV) to resorcin.

The composition comprising the compound of the formula (IV) and the compound of the formula (V) can be isolated from the reaction mixture containing these compounds in the same manner as in the isolation method for the compound of the formula (III).

When the compound of the formula (IV) is not less than 60% by mass, the resistance to humidity aged adhesion is improved in the adhesion after being compounded with rubber. Considering from viewpoint of the improvement of the resistance to humidity aged adhesion, the content of the compound of the formula (IV) is preferably 70-100% by mass, more preferably 80-100% by mass.

When the compound (D1) represented by the general formula (III) is compounded into the rubber composition for coating rubber, the amount of the compound of the formula (III) is within a range of 0.1-10 parts by mass, preferably 0.3-6 parts by mass based on 100 parts by mass of the rubber component. When the amount of the compound of the formula (III) is less than 0.1 part by mass based on 100 parts by mass of the rubber component, the effect of improving the resistance to humidity aged adhesion is low, while when it exceeds 10 parts by mass, the compound is bloomed to deteriorate the adhesion property.

Also, when the composition (D2) comprising the compound of the formula (IV) and the compound of the formula (V) is compounded into the rubber composition for coating rubber, the amount of the composition compounded is within a range of 0.1-10 parts by mass, preferably 0.3-6 parts by mass based on 100 parts by mass of the rubber component. When the amount of the composition consisting essentially of the compound of the formula (IV) is less than 0.1 part by mass based on 100 parts by mass of the rubber component, the effect of improving the resistance to humidity aged adhesion is low, while when it exceeds 10 parts by mass, the composition consisting essentially of the compound of the formula (IV) is bloomed to deteriorate the adhesion property.

The compound (D1) having the aforementioned particular structure and the composition (D2) consisting essentially of such a compound have a feature that the mixing with the rubber component is easy as compared with resorcin or RF resin. Therefore, the rubber composition compounded with this compound or the composition consisting essentially of such a compound tend to hardly cause the blooming as compared with the rubber composition compounded with resorcin or RF resin. This is presumed due to the fact that the compound having the particular structure and the composition consisting essentially of such a compound is low in the polarity as compared with resorcin or RF resin. Further, the rubber composition compounded with this compound or the composition consisting essentially of such a compound is less in the change with the lapse of time and develops a stable adhesion property irrespectively of the storing time. Moreover, the rubber composition compounded with the rubber composition compounded with this compound or the composition consisting essentially of such a compound is sufficiently low in the Mooney viscosity and excellent in the processability in addition to the control of blooming, which is a problem in the rubber composition compounded with resorcin or RF resin.

The rubber composition used in the coating rubber is preferable to further contain a cobalt salt of an organic acid as an adhesion promoter in an amount as a cobalt content of 0.03-1 part by mass based on 100 parts by mass of the rubber component. When the amount of the organic acid cobalt salt as a cobalt content is less than 0.03 part by mass, the adhesion property between the coating rubber and the steel cord is not sufficient, while when it exceeds 1 part by mass, the anti-aging property of the coating rubber is extremely deteriorated. As the organic acid cobalt salt are mentioned cobalt naphthanate, cobalt stearate, cobalt neodecanate, coblat rosinate, cobaly versatate, cobalt tallate and the like. The organic acid cobalt salt may be a composite salt in which a part of the organic acid is replaced with boric acid or the like. Concretely, MANOBOND (trade mark, made by OMG) is mentioned.

The rubber composition for coating rubber may be properly compounded with additives usually used in the rubber industry such as a filler such as carbon black, silica or the like, a silane coupling agent for silica, a vulcanization accelerator, a softening agent such as aromatic oil or the like, a methylene donor such as hexamethylene tetramine, pentamethoxymethyl melamine, hexamethylenemethyl melamine or the like, zinc oxide, stearic acid, a vulcanization accelerator, an accelerator activator, an antioxidant, an antiozonant and so on within a range of not damaging the effects of the invention in addition to the rubber component (A), sulfur (B), the compound including substituted benzene ring (C), the compound having a particular structure (D1), the composition (D2) consisting essentially of such a compound and the organic acid cobalt salt.

The steel cord used in at least one of the carcass 4 and the belt 6 of the pneumatic tire according to the invention is constructed by twisting a plurality of steel wires each plated on its peripheral face with a brass and having an amount of phosphorus as an oxide in a surface layer region from a surface of the plated brass to a depth of 5 nm inward in a radial direction of the wire controlled to not more than 1.5 atomic %. When the amount of phosphorus in the surface layer region of the steel wire plated with the brass exceeds 1.5 atomic %, the adhesion rate to the coating rubber becomes delayed, so that the desired initial adhesion property can not be ensured but also the resistance to humidity aged adhesion can not be improved sufficiently.

The amount of phosphorus included as an oxide in the surface layer region can be measured by an X-ray photoelectron spectroscopy. That is, the number of atoms for all elements and the number of phosphorus atoms in the oxide are detected in an escape depth region of photoelectrons measured by the X-ray photoelectron spectroscopy and the number of phosphorus atoms in the oxide is represented by an index on the basis that the number of atoms for all elements is 100, which is atomic % of phosphorus in such a region. Moreover, the discrimination between phosphorus as the oxide and the other phosphorus can be carried out based on a chemical shift of a bonding energy of P=p photoelectrons measured by X-ray photoelectron spectroscopy of phosphorus. Also, the surface layer region up to a depth of 5 nm can be recognized by kinetic energy and escape depth of electrons disclosed in a general article relating to solid photoelectron spectroscopy.

The average thickness of the brass plated layer in the steel wire is preferable to be a range of 0.13-0.35 μm. When the average thickness of the plated layer is less than 0.13 μm, a portion exposing iron matrix is increased to obstruct the initial adhesion property, while when it exceeds 0.35 μm, the adhesion reaction excessively proceeds due to heat in the use of the tire and only brittle adhesion is obtained.

A ratio of copper to a sum of copper and zinc in the brass plated layer of the steel wire is preferably a range of 60-70% by weight, while a ratio of copper to a sum of copper and zinc in the surface layer region is preferably a range of 15-45 atomic %. When the ratio of copper to the sum of copper and zinc over the whole of the plated layer is less than 60% by weight, the drawability is deteriorated and the productivity is obstructed due to wire breakage and the mass production becomes difficult but also it is difficult to control the copper content in the surface layer region to not less than 15 atomic %, while when it exceeds 70% by weight, the resistance to humidity aged adhesion lowers and the sufficient durability against environment exposing the tire can not be maintained but also it is difficult to control the copper content in the surface layer region to not more than 45 atomic %. On the other hand, when the ratio of copper to the sum of copper and zinc in the surface layer region is less than 15 atomic %, even if the phosphorus amount in the surface layer region is limited to not more than 1.5 atomic %, the adhesion reaction to the coating rubber is poor and hence it is difficult to ensure the adhesion property to the coating rubber, while when it exceeds 45 atomic %, the resistance to humidity aged adhesion is deteriorated.

The steel wire is preferable to have a diameter of not more than 0.40 mm. When the diameter of the steel wire exceeds 0.40 mm, surface strain becomes large if the tire is repeatedly subjected to strain under bending deformation, and hence the buckling is easily caused.

The steel wire is produced, for example, by subjecting a wire rod having a diameter of about 5 mm to a wire drawing. Moreover, the phosphorus amount included as an oxide in the surface layer region can be controlled to not more than 1.5 atomic % by adjusting a pass schedule of the wire drawing, form and angle of entrance or approach of a die, a material of the die, a composition of a lubricant and the like alone or in a proper combination thereof. Particularly, it is very effective to conduct the wire drawing by using a lubricant including an extreme pressure additive at the final drawing step likewise the usual step and applying a die made from a material having excellent self-lubricity and cutting property such as a sintered diamond die to a final pass or about several pass inclusive of the final pass among dies for approximately 20 pass in the final drawing step. By twisting a plurality of the thus obtained steel wires is obtained a steel cord used in the carcass 4 and/or the belt 6 for the tire according to the invention. Moreover, the size of the steel cord, twisting number and twisting condition and the like care properly selected in accordance with the performances required in the tire.

The preparation method of the rubber composition for coating rubber is not particularly limited, and the rubber composition can be prepared, for example, by milling the rubber component (A), sulfur (B), the compound including the substituted benzene ring, the compound having a particular structure (D1), the composition consisting essentially of such a compound (D2), the organic acid cobalt salt and various additives. The milled rubber composition is shaped into a sheet, and further shaping is carried out at a state of sandwiching steel cords between the two shaped rubber sheets to form a carcass ply or a belt layer. The formed belt layer is laminated at the outside of the carcass in the radial direction of the tire according to the usual manner, which constitutes the pneumatic tire according to the invention together with the other members. To the tread portion, sidewall portion, bead portion and the like in the pneumatic tire according to the invention can be properly adopted the materials, forms and arrangement used in the corresponding portions of the usual tire. Also, as a gas to be filled in the tire can be used usual air or air having an adjusted oxygen partial pressure, and an inert gas such as nitrogen, argon, helium or the like.

EXAMPLES

The following examples are given in illustration of the invention and are not intended as limitations thereof.

(Preparation Method of Steel Cord)

A steel wire having a controlled amount of phosphorus included as an oxide in a surface layer region is prepared by controlling a pass schedule of wire drawing, form and angle of entrance or approach of a die, a die material and a composition of a lubricant in the wire drawing. Then, a plurality of the thus obtained steel wires are twisted to produce a steel cord of 1×5 structure having a filament diameter of 0.25 mm and a brass plated layer (Cu: 63% by mass, Zn: 37% by mass).

Next, A rubber composition is prepared by milling and mixing a rubber component, a compound including a substituted benzene ring, sulfur, an organic acid cobalt salt and various additives according to a compounding recipe shown in Table 1 in a Bunbary mixer of 2200 mL. Then, the steel cords are covered with the rubber composition to form a belt layer. A radial tire provided with such a belt layer and having a tire size of 185//70R14 is prepared according to the usual manner, and the adhesion property between the steel cord and the coating rubber in the belt layer of this tire is evaluated by the following method. The results are shown in Table 1.

(1) Initial Adhesion Property

After the tire to be tested is vulcanized a vulcanization time corresponding to a half of the usual time, the belt layer is taken out from the tire and the steel cord in the belt layer is pulled out at a rate of 50 mm/min by a tensile testing machine to visually observe a state of covering the exposed steel cord with rubber, and as a result, a covering ratio is indicated by 0-100% as an indication of the initial adhesion property. The larger the numerical value, the higher and better the initial adhesion property.

(2) Resistance to Humidity Aged Adhesion

After the tire to be tested is left to stand in a temperature and humidity controlled vessel of 100° C. and 95% RH for 5 weeks, the belt layer is taken out from the tire and the steel cord in the belt layer is pulled out at a rate of 50 mm/min by a tensile testing machine to visually observe a state of covering the exposed steel cord with rubber, and as a result, a covering ratio is indicated by 0-100% as an indication of the resistance to humidity aged adhesion. The larger the numerical value, the higher and better the resistance to humidity aged adhesion.

TABLE 1

| | | | Example 1 | Example 2 | Comparative Example 1 | Comparative Example 2 | Comparative Example 3 | Comparative Example 4 |
|---|---|---|---|---|---|---|---|---|
| Coating rubber recipe | natural rubber | parts by mass | 100 | 100 | 100 | 100 | 100 | 100 |
| | carbon black (N326) | | 60 | 60 | 60 | 60 | 60 | 60 |
| | sulfur | | 5 | 5 | 5 | 5 | 5 | 5 |
| | zinc oxide | | 5 | 5 | 5 | 5 | 5 | 5 |
| | vulcanization accelerator *1 | | 1 | 1 | 1 | 1 | 1 | 1 |
| | antioxidant *2 | | 2 | 2 | 2 | 2 | 2 | 2 |
| | cobalt salt of organic acid *3 | | 1 | 1 | 1 | 1 | 1 | 1 |
| | resorcin | | 2- | — | — | 2 | — | — |
| | RF resin *4 | | — | 2 | — | — | 2 | — |
| Steel cord | amount of phosphorus in surface layer region *5 | atomic % | 1.00 | 1.00 | 1.00 | 2.50 | 2.50 | 2.50 |
| Evaluation results | Initial adhesion property | % | 100 | 100 | 100 | 80 | 80 | 80 |
| | Resistance to humidity aged adhesion | % | 100 | 95 | 35 | 50 | 40 | 20 |

*1 N,N'-dicyclohexyl-2-benzothiazyl sulfenamide, NOCCELER DZ made by OUCHISHINKO CHEMICAL INDUSTRIAL CO., LTD.
*2 N-phenyl-N'-(1,3-dimethylbutyl)-p-phenylenediamine, NOCRAC 6C made by OUCHISHINKO CHEMICAL INDUSTRIAL CO., LTD.
*3 MANOBOND C22.5, trade name made by OMG, cobalt content = 22.5% by mass
*4 B19S, trade name made by Indspec
*5 amount of phosphorus included as an oxide in a surface layer region from a surface of the plated brass to a depth of 5 nm inward in a radial direction of the wire As seen from the results of Comparative Example 1, the resistance to humidity aged adhesion between the steel cord and the coating rubber is low in case of using only the steel cord made from the wires having a decreased amount of phosphorus in surface layer region. Also, as seen from the results of Comparative Examples 2 and 3, in case of using only the coating rubber comprising the compound including the substituted benzene ring, the low initial adhesion property can not be improved though the resistance to humidity aged adhesion between the steel cord and the coating rubber is somewhat improved as compared with Comparative Example 4. On the contrary, as seen from the results of Examples 1 and 2, the initial adhesion property between the steel cord and the coating rubber is improved by covering the steel cord made from the wires having a decreased amount of phosphorus in surface layer region with the coating rubber comprising the compound including the substituted benzene ring, but also the resistance to humidity aged adhesion can be largely improved by the synergistic effect.

Production Example 1

A solution of 330.6 g (3.0 mol) of resorcin dissolved in 600.0 g of pyridine is placed on an ice bath below 15° C. and 54.9 g (0.30 mol) of adipoyl chloride is added dropwise thereto. After the completion of the addition, the resulting reaction mixture is raised to room temperature and left to stand over whole day and night to complete the reaction. From the reaction mixture is distilled off pyridine under a reduced pressure, and the residue is added with 1200 g of water and cooled on ice to obtain precipitates. The precipitates are filtered, washed with water and dried under a reduced pressure to obtain 84 g of white-light yellowish powder. The powder is treated through a liquid chromatography provided with a preparative apparatus under the following conditions to dispense an elutant containing main components. The elutant is concentrated and the precipitated crystal is recovered by filtration and dried under a reduced pressure to obtain a crystal having a melting point of 140-143° C. As a result of analysis, this crystal is bis(3-hydroxyphenyl) adipate.

The HPLC conditions for preparation are as follows.
Column: Shim-pack PREP-ODS (made by Shimadzu Corp.
Column temperature: 25° C.
Eluent: mixed solvent of methanol/water (85/15(w/w %))
Flow rate of eluent: flow amount 3 ml/min
Detector: UV detector (254 nm)
Moreover, the identification data of bis(3-hydroxcyphenyl) adipate are as follows.
MS spectrum data
EI (Pos.) m/z=330
IR spectrum data
3436 cm−1: hydroxy group
2936 cm−1: alkyl
1739 cm−1: ester
NMR spectrum data are shown in Tables 2-1 and 2-2.

TABLE 2-1

| C-NMR | |
|---|---|
| Symbol | Found value (ppm) |
| ① | 23.7 |
| ② | 33.1 |
| ③ | 109 |
| ④ | 112.1 |
| | 112.8 |

TABLE 2-1-continued

| C-NMR | |
|---|---|
| Symbol | Found value (ppm) |
| ⑤ | 129.8 |
| ⑥ | 151.4 |
| ⑦ | 158.2 |
| ⑧ | 171.5 |

TABLE 2-2

| H-NMR | | | |
|---|---|---|---|
| Symbol | Found value (ppm) | Assignment | Proton ratio |
| a | 1.7 | —CH2— | 2 |
| b | 2.6 | —CH2— | 2 |
| c | 6.4-6.7 | =CH | 3 |
| d | 7.2 | =CH | 1 |
| e | 9.7 | —OH | 1 |

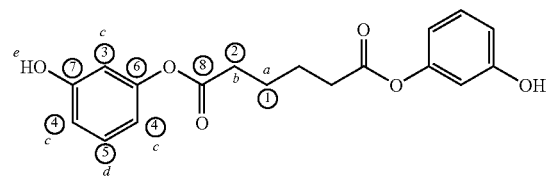

Production Example 2

As a result of analysis on 84 g of a powder obtained by the same reaction as in Production Example 1 through HPLC, bis(3-hydroxyphenyl) adipate in the powder is 89% by mass. This powder contains compounds represented by the following formula (VIII) (which may be called as an oligomer hereinafter), in which a compound of n=2 is 7% by mass and a compound of n=3 is 2% by mass, and 2% by mass of resorcin as a starting material. Moreover, the identification of the compound represented by the formula (VIII) is carried out by LC-MS.

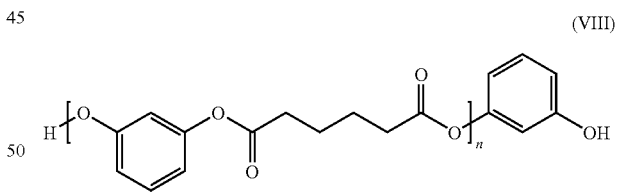

(VIII)

The measuring conditions of MS spectrum are as follows.
Mass range: 200-2000 amu (1.98+0.02 sec)
Ionization process: ESI (electrospray)
Mode: positive
Capillary: 3.15 kV
Cone: 35 V
S.B. Temp.: 150° C.
Deslv. tmp: 400° C.
Multi: 650 V
N2: 750 L/hr
n=2: 551.1[M;H]+, 568.2[M+H]+
n=3: 771.2[M+H]+, 788.2[M+H]+
n=4: 1008.3[M+H]+
n=5: 1228.3[M+H]+

Also, the analytical conditions of HPLC are as follows.

1. Analysis of bis(3-hydroxyphenyl) Adipate, Resorcin

Column: A-312 ODS, made by YMC

Column temperature: 40° C.

Eluent: methanol/water=7/3 (adjusted to pH=3 with phosphoric acid)

Detection: UV (254 nm)

2. Analysis of Oligomer

Column: A-312 ODS, made by YMC

Column temperature: 40° C.

Eluent: acetonitrile/water=8/2 (adjusted to pH=3.5 with acetic acid)

Detection: UV (254 nm)

Production Example 3

The same procedure as in Production Example 1 is repeated except that resorcin is 176.2 g (1.6 mol) and pyridine is 400 g and adipoyl chloride is 73.2 g (0.40 mol) to obtain 118.6 g of a powder. As a result of HPLC analysis, this powder contains 73.4% by mass of bis(3-hydroxyphenyl) adipate, 13.9% by mass of the compound of n=2 in the formula (VIII), 3.0% by mass of the compound of n=3 in the formula (VIII), 0.8% by mass of the compound of n=4 in the formula (VIII), 0.2% by mass of the compound of n=5 in the formula (VIII) and 2.9% by mass of resorcin as a starting material.

Production Example 4

A solution of 440.4 g (4.0 mol) of resorcin dissolved in 405.0 g of pyridine is placed on an ice bath below 15° C. and 62.0 g (0.4 mol) of succinic acid dichloride is added dropwise thereto. After the completion of the addition, the resulting reaction mixture is raised to room temperature and left to stand over whole day and night to complete the reaction. From the reaction mixture is distilled off pyridine under a reduced pressure, and the residue is added with 1800 g of water and cooled on ice, whereby the whole of the solution become clouded and separated into two layers. The extraction operation is carried out by adding 200 g of water and 600 g of ethyl acetate to the oil layer. The thus obtained organic layer is washed with a cold water 5 times and dried on magnesium sulfate. Thereafter, ethyl acetate is distilled off and the resulting viscous matter is crystallized by adding 500 g of toluene, filtered and washed with toluene and subjected to sludging with 1 L of water 2 times. The resulting wet body is dissolved into 100 g of methanol and added with 1 L of water to conduct recrystallization, filtered, washed and dried to obtain 82.3 g of a light yellowish powder. As a result of analysis, the main component of the powder is a component corresponding to 91.0 area %. Also, the powder contains 0.7% by mass of resorcin. As a result of structural analysis, the main component of the powder is bis(3-hydroxyphenyl) succinate.

Moreover, the identification data of bis(3-hydroxyphenyl) succinate are as follows.

MS spectrum data

EI (Pos.) m/z=302

IR spectrum data 3361 cm−1: hydroxy group 2984 cm−1: alkyl 1732 cm−1: ester

NMR spectrum data are shown in Tables 3-1 and 3-2.

TABLE 3-1

| C-NMR | |
|---|---|
| Symbol | Found value (ppm) |
| ① | 30.1 |
| ② | 109.9 |
| ③ | 113.5 |
|  | 114 |
| ④ | 130.8 |
| ⑤ | 153.1 |
| ⑥ | 159.6 |
| ⑦ | 172.7 |

TABLE 3-2

| H-NMR | | | |
|---|---|---|---|
| Symbol | Found value (ppm) | Assignment | Proton ratio |
| a | 3 | —CH2CH2— | 4 |
| b | 6.5-6.7 | =CH | 6 |
| c | 7.2 | =CH | 2 |

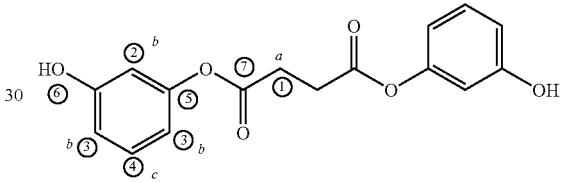

Production Example 5

A solution of 330.3 g (3.0 mol) of resorcin dissolved in 303.7 g of pyridine is placed on an ice bath below 15° C. and 71.7 g (0.30 mol) of sebacic acid dichloride is added dropwise thereto. After the completion of the addition, the resulting reaction mixture is raised to room temperature and left to stand over whole day and night to complete the reaction. From the reaction mixture is distilled off pyridine under a reduced pressure, and the residue is added with 250 g of water and cooled on ice to obtain precipitates. The precipitates are filtered, washed with water and dried under a reduced pressure to obtain 102.8 g of white-light yellowish powder. As a result of HPLC analysis, the main component of the powder is a component corresponding to 98.7 area %. Also, the powder contains 0.2% by mass of resorcin. As a result of structural analysis, the main component of the powder is bis(3-hydroxyphenyl) sebacate.

Moreover, the identification data of bis(3-hydroxyphenyl) sebacate are as follows.

MS spectrum data

EI (Pos.) m/z=386

IR spectrum data 3380 cm−1: hydroxy group 3000-2800 cm−1: long-chain alkyl 1732, 1749 cm−1: ester NMR spectrum data are shown in Tables 4-1 and 4-2.

TABLE 4-1

| | C-NMR | |
|---|---|---|
| Symbol | | Found value (ppm) |
| ① | | 26 |
| ② | | 30.1 |
| | | 30.2 |
| ③ | | 34.96 |
| | | 34.05 |
| ④ | | 110 |
| ⑤ | | 113.5 |
| | | 113.8 |
| ⑥ | | 130.8 |
| ⑦ | | 153.2 |
| ⑧ | | 159.6 |
| ⑨ | | 174 |

TABLE 4-2

| | H-NMR | | |
|---|---|---|---|
| Symbol | Found value (ppm) | Assignment | Proton ratio |
| a | 1.4 | —CH2— | 8 |
| b | 1.7 | —CH2— | 4 |
| c | 2.6 | —CH2— | 4 |
| d | 6.4-6.7 | =CH | 6 |
| e | 7.2 | =CH | 2 |

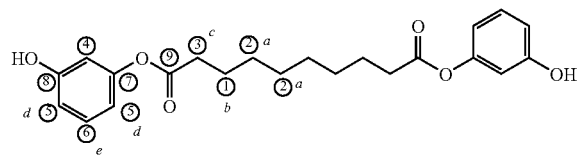

Production Example 6

A solution of 440.4 g (4.0 mol) of resorcin dissolved in 405 g of pyridine is placed on an ice bath below 15° C. and a suspension of 81.2 g (0.4 mol) of terephthalic acid dichloride in 180 g of toluene is added dropwise thereto. After the completion of the addition, the resulting reaction mixture is raised to room temperature and left to stand over whole day and night to complete the reaction. From the reaction mixture is distilled off pyridine under a reduced pressure, and the residue is cooled on air to obtain precipitates. The precipitates are suspended with 300 g of water and discharged into 1 L of water, and the resulting precipitates are filtered, washed with water and dried under a reduced pressure to obtain 130.0 g of beige powder. As a result of HPLC analysis, the main component of the powder is a component corresponding to 90.7 area %. Also, the powder contains 0.2% by mass of resorcin. As a result of structural analysis, the main component of the powder is bis(3-hydroxyphenyl) terephthalate.

Production Example 7

A solution of 440.4 g (4.0 mol) of resorcin dissolved in 405 g of pyridine is placed on an ice bath below 15° C. and a suspension of 81.2 g (0.4 mol) of isophthalic acid dichloride in 80 g of toluene is added dropwise thereto. After the completion of the addition, the resulting reaction mixture is raised to room temperature and left to stand over whole day and night to complete the reaction. From the reaction mixture is distilled off pyridine under a reduced pressure, and the residue is cooled in air to obtain precipitates. The precipitates are added with 500 g of water, maturated under cooling with ice, filtered and washed to obtain a wet body. The wet body is dissolved in 200 g of methanol, discharged into 2 L of water, and the resulting precipitates are filtered, washed with water and dried under a reduced pressure to obtain 130.2 g of beige powder. As a result of HPLC analysis, the main component of the powder is a component corresponding to 89.4 area %. Also, the powder contains 0.8% by mass of resorcin. As a result of structural analysis, the main component of the powder is bis(3-hydroxyphenyl) isophthalate.

Examples 3-11

An uncured rubber composition is prepared by using the composition produced in Production Examples 1-7 as a compound to be tested and mixing and milling according to a compounding recipe shown in Table 5 with a Bunbary mixer of 2200 mL, and the blooming resistance and Mooney viscosity are measured and evaluated by the following methods. Also, the steel cords (amount of phosphorus in surface layer region=1.00 atomic %) are covered with the resulting rubber composition to form a belt layer, and a radial tire provided with such a belt layer and having a tire size of 185/70R14 is prepared according to the usual manner, and then the initial adhesion property and resistance to humidity aged adhesion between the steel cord and the coating rubber in the belt layer of the tire are evaluated by the aforementioned methods and further the adhesion stability is evaluated by the following method. The results are shown in Table 5.

(3) Blooming Resistance

After the uncured rubber composition is stored at 40° C. for 7 days, whether the additive is separated out on the rubber surface is visually confirmed and judged by ○, Δ, X.

○: the additive is not separated out on the surface
Δ: the additive is partly separated out
X: the additive is separated out on the whole surface (4) Mooney Viscosity The Mooney viscosity ML1+4 (130° C.) of the rubber composition is measured according to JIS K6300-1:2001. The smaller the numerical value, the better the processability of the rubber composition.

(5) Adhesion Stability

After a shaped green tire is left to stand at 40° C. and 80% RH for 7 days and then vulcanized, the belt layer is taken out from the tire, and the steel cords are pulled from the belt layer at a rate of 50 mm/min with a tensile testing machine to visually observe a rubber covering state of the exposed steel cord, and a covering ratio is represented by 0-100% as an indication of the adhesion stability. The larger the numerical value, the higher and better the adhesion stability.

Comparative Example 5

A rubber composition is prepared and evaluated in the same manner as described in the examples except that the composition obtained in the above production examples is not used as a compound to be tested. Also, a tire is prepared by covering steel cords (amount of phosphorus in surface layer region=2.50 atomic %) with the rubber composition to form a belt layer, and evaluated in the same manner as in the examples. The results are shown in Table 6.

Comparative Example 6

A rubber composition is prepared and evaluated in the same manner as in the examples except that 2 parts by mass of resorcin as a compound to be tested is compounded in a basic recipe of rubber. Also, a tire is prepared by covering steel cords (amount of phosphorus in surface layer region=2.50 atomic %) with the rubber composition to form a belt layer, and evaluated in the same manner as in the examples. The results are shown in Table 6.

Comparative Example 7

A rubber composition is prepared and evaluated in the same manner as in the examples except that 2 parts by mass of RF resin as a compound to be tested is compounded in a basic recipe of rubber. Also, a tire is prepared by covering steel cords (amount of phosphorus in surface layer region=2.50 atomic %) with the rubber composition to form a belt layer, and evaluated in the same manner as in the examples. The results are shown in Table 6. Moreover, the RF resin is produced as follows.

(Production Method of RF Resin)

At first, 1100 g of water, 1100 g (10 mol) of resorcin and 1.72 g (10 mmol) of p-toluene sulfonic acid are charged into a four-necked flask provided with a cooling tube, an agitating device, a thermometer, a dropping funnel and a nitrogen introducing tube, and the temperature is raised to 70° C. 477 g (5.9 mol) of 37% formalin solution is added dropwise over 2 hours and the temperature is kept for 5 hours to complete the reaction. After the completion of the reaction, the mass is neutralized by adding 4 g of 10% sodium hydroxide solution, and the cooling tube is replaced with a Dean-Stark type reflux condenser, and then the temperature is raised to 150° C. while distilling off water and further water is removed under a reduced pressure of 20 mmHg over 1 hour to obtain an RF resin. The resulting RF resin has a softening point of 124° C. and a residual resorcin content of 17%.

Comparative Example 8

A rubber composition is prepared in the same manner as in Example 4 except that 12 parts by mass of the composition produced in Production Example 2 as a compound to be tested is compounded into rubber recipe of Example 4 and then evaluated in the same manner as in the examples. Also, a tire is prepared by covering steel cords (amount of phosphorus in surface layer region=2.50 atomic %) with the rubber composition to form a belt layer, and evaluated in the same manner as in the examples. The results are shown in Table 6.

Comparative Example 9

A rubber composition is prepared and evaluated in the same manner as in the examples except that 2 parts by mass of a mixed polyester described in JP-A-H07-118621 as a compound to be tested is compounded in a basic recipe of rubber. Also, a tire is prepared by covering steel cords (amount of phosphorus in surface layer region=2.50 atomic %) with the rubber composition to form a belt layer, and evaluated in the same manner as in the examples. The results are shown in Table 6. Moreover, the mixed polyester is produced as follows according to Example 1 described in the above patent document.

(Production Method of Mixed Polyester)

Into a four-necked flask of 300 mL provided with a reflux condenser and a thermometer are charged 108.9 g (0.99 mol) of resorcin, 131.4 g (0.90 mol) of adipic acid, 222.0 g (2.175 mol) of acetic acid anhydride and 0.54 g (0.5% by mass to resorcin) of pyridine, which are stirred at room temperature for 15 minutes after being purged with nitrogen, and the temperature is raised to 100° C. and acetylation is conducted at this temperature for 2 hours. Thereafter, the temperature is raised while distilling off a by-produced acetic acid, whereby maturation is carried out at 140° C. for 1 hour and further at 240° C. for 2 hours. Then, the maturation is continued at 240° C. under a reduced pressure (50 mmHg). The reaction mixture is discharged onto a porcelain dish to obtain 195.6 g of an ocher candy mass. The candy mass is crystallized by milling with a glass rod. As a result of analysis, it contains 0.1% by mass of resorcin, 0.5% by mass of resorcin monoacetate and 0.8% by mass of resorcin diacetate. As the molecular weight is measured by GPC, the weight average molecular weight is about 30000 (converted to PS).

Comparative Example 10

A rubber composition is prepared are evaluated in the same manner as in the examples except that the composition produced in the production examples is not used as a compound to be tested. Also, a tire is prepared by covering steel cords (amount of phosphorus in surface layer region=1.00 atomic %) with the rubber composition to form a belt layer, and evaluated in the same manner as in the examples. The results are shown in Table 6.

TABLE 5

| | | | Example 3 | Example 4 | Example 5 | Example 6 | Example 7 | Example 8 | Example 9 | Example 10 | Example 11 |
|---|---|---|---|---|---|---|---|---|---|---|---|
| Coating rubber recipe | natural rubber | parts by mass | 100 | 100 | 100 | 100 | 100 | 100 | 100 | 100 | 100 |
| | carbon black (N326) | | 60 | 60 | 60 | 60 | 60 | 60 | 60 | 60 | 60 |
| | sulfur | | 5 | 5 | 5 | 5 | 5 | 5 | 5 | 5 | 5 |
| | zinc oxide | | 5 | 5 | 5 | 5 | 5 | 5 | 5 | 5 | 5 |
| | vulcanization accelerator *1 | | 1 | 1 | 1 | 1 | 1 | 1 | 1 | 1 | 1 |
| | antioxidant *2 | | 2 | 2 | 2 | 2 | 2 | 2 | 2 | 2 | 2 |
| | cobalt compound *3 | | 1 | 1 | 1 | 1 | 1 | 1 | 1 | 1 | 1 |
| | test composition kind | | Production Example 1 | Production Example 2 | Production Example 2 | Production Example 2 | Production Example 3 | Production Example 4 | Production Example 5 | Production Example 6 | Production Example 7 |
| | | amount | 2 | 2 | 0.5 | 8 | 2 | 2 | 2 | 2 | 2 |
| Steel cord | amount of phosphorus in surface layer region *5 | atomic % | 1.00 | 1.00 | 1.00 | 1.00 | 1.00 | 1.00 | 100 | 1.00 | 1.00 |

TABLE 5-continued

| | | | Example 3 | Example 4 | Example 5 | Example 6 | Example 7 | Example 8 | Example 9 | Example 10 | Example 11 |
|---|---|---|---|---|---|---|---|---|---|---|---|
| Evaluation results | Blooming resistance | | ○ | ○ | ○ | ○ | ○ | ○ | ○ | ○ | ○ |
| | ML1 + 4(130° C.) | | 76.4 | 77.1 | 73.1 | 78.8 | 77.3 | 78.5 | 75.0 | 74.2 | 69.8 |
| | Initial adhesion property | % | 100 | 100 | 100 | 100 | 100 | 100 | 100 | 100 | 100 |
| | Resistance to wet-heat adhesion | % | 100 | 100 | 95 | 100 | 100 | 100 | 100 | 90 | 95 |
| | Adhesion stability | % | 100 | 100 | 100 | 95 | 100 | 100 | 100 | 100 | 100 |

*1, *2. *3 and *5 are the same as in Table 1

TABLE 6

| | | | Comparative Example 5 | Comparative Example 6 | Comparative Example 7 | Comparative Example 8 | Comparative Example 9 | Comparative Example 10 |
|---|---|---|---|---|---|---|---|---|
| Coating rubber recipe | natural rubber | parts by mass | 100 | 100 | 100 | 100 | 100 | 100 |
| | carbon black (N326) | | 60 | 60 | 60 | 60 | 60 | 60 |
| | sulfur | | 5 | 5 | 5 | 5 | 5 | 5 |
| | zinc oxide | | 5 | 5 | 5 | 5 | 5 | 5 |
| | vulcanization accelerator *1 | | 1 | 1 | 1 | 1 | 1 | 1 |
| | antioxidant *2 | | 2 | 2 | 2 | 2 | 2 | 2 |
| | cobalt compound *3 | | 1 | 1 | 1 | 1 | 1 | 1 |
| | test composition  kind | | none | resorcin | RF resin | Production Example 2 | polyester | none |
| | amount | | — | 2 | 2 | 12 | 2 | — |
| Steel cord | amount of phosphorus in surface layer region *5 | atomic % | 2.50 | 2.50 | 2.50 | 2.50 | 2.50 | 1.00 |
| Evaluation results | Blooming resistance | | ○ | X | Δ | Δ | ○ | ○ |
| | ML1 + 4(130° C.) | | 73.5 | 81.9 | 82.5 | 82.7 | 84.5 | 73.5 |
| | Initial adhesion property | % | 80 | 80 | 80 | 85 | 70 | 100 |
| | Resistance to wet-heat adhesion | % | 50 | 90 | 60 | 80 | 60 | 70 |
| | Adhesion stability | % | 100 | 70 | 75 | 80 | 100 | 100 |

*1, *2. *3 and *5 are the same as in Table 1

As seen from the results of Examples 3-11, the initial adhesion property between the steel cord and the coating rubber is improved by covering the steel cords each made from steel wires having the decreased amount of phosphorus in surface layer region with the coating rubber containing the compound of the particular structure or the composition consisting essentially of such a compound, but also the resistance to humidity aged adhesion can be largely improved by the synergistic effect. Also, the rubber compositions used in Examples 3-11 are good in the blooming resistance because the rise of the Mooney viscosity is suppressed.

On the other hand, as seen from the comparison among Examples 3-11 and Comparative Example 10, the resistance to humidity aged adhesion between the steel cord and the coating rubber is low in case of using only the steel cord made from steel wires having the decreased amount of phosphorus in surface layer region.

Also, in the tire of Comparative Example 6 or 7 using the rubber composition containing resorcin or RF resin as the coating rubber for the belt layer, the humidity aged adhesion is improved as compared with the tire of Comparative Example 5, but since the rising breadth of the Mooney viscosity in the rubber composition used for the coating rubber is large, the blooming resistance is poor and the adhesion stability is deteriorated. Further, the tire of Comparative Example 9 using the rubber composition compounded with the mixed polyester as the coating rubber for the belt layer is insufficient in the initial adhesion property and humidity aged adhesion.

Moreover, as seen from the results of Examples 4-6 and Comparative Example 8, there is a tendency that as the compounding amount of the composition produced in the production examples is increased, the Mooney viscosity of the rubber composition is raised to deteriorate the processability, so that the compounding amount of the composition produced in the production examples is necessary to be within a range of 0.1-10 parts by mass based on 100 parts by mass of the rubber component.

The invention claimed is:

1. A pneumatic tire comprising a carcass comprised of one or more carcass plies and a belt disposed on an outside of the carcass in a radial direction of the tire and comprised of one or more belt layers, in which at least one of the carcass and the belt including a layer of steel cords covered with a coating rubber, characterized in that as a coating rubber covering steel cords in at least one of the carcass and the belt is used a rubber composition comprising a rubber component, 1-10 parts by mass of sulfur and 0.1-10 parts by mass of a compound represented by the following general formula (III):

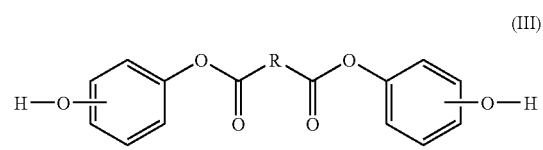

(III)

[wherein R is a bivalent aliphatic group having a carbon number of 1-16 or a bivalent aromatic group] based on 100 parts by mass of the rubber component, and as the steel cord is used a steel cord formed by twisting a plurality of steel wires each plated on its peripheral face with a brass and having an amount of phosphorus as an oxide in a surface layer region from a surface of the plated brass to a depth of 5 nm inward in a radial direction of the wire controlled to not more than 1.5 atomic %.

2. A pneumatic tire according to claim 1, wherein the compound represented by the general formula (III) is a compound represented by the following general formula (IV):

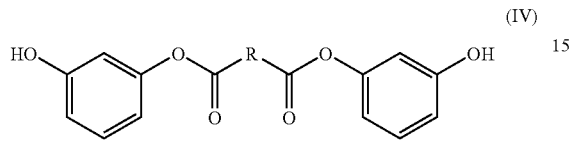

(IV)

[wherein R is a bivalent aliphatic group having a carbon number of 1-16 or a bivalent aromatic group].

3. A pneumatic tire comprising a carcass comprised of one or more carcass plies and a belt disposed on an outside of the carcass in a radial direction of the tire and comprised of one or more belt layers, in which at least one of the carcass and the belt including a layer of steel cords covered with a coating rubber, characterized in that as a coating rubber covering steel cords in at least one of the carcass and the belt is used a rubber composition comprising a rubber component, 1-10 parts by mass of sulfur and 0.1-10 parts by mass of a composition comprising 60-100% by mass of a compound represented by the general formula (IV), 0-20% by mass of a compound represented by the following general formula (V) and n=2, 0-10% by mass of a compound represented by the following general formula (V) and n=3 and 0-10% by mass in total of compounds represented by the following general formula (V) and n=4-6:

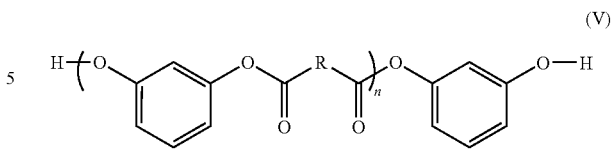

(V)

[wherein R is a bivalent aliphatic group having a carbon number of 1-16 or a bivalent aromatic group and n is an integer of 2-6] based on 100 parts by mass of the rubber component, and as the steel cord is used a steel cord formed by twisting a plurality of steel wires each plated on its peripheral face with a brass and having an amount of phosphorus as an oxide in a surface layer region from a surface of the plated brass to a depth of 5 nm inward in a radial direction of the wire controlled to not more than 1.5 atomic %.

4. A pneumatic tire according to claim 2 or 3, wherein R in the general formula (IV) is an alkylene group having a carbon number of 2-10 or a phenylene group.

5. A pneumatic tire according to claim 3, wherein R in the general formulae (IV) and (V) is an alkylene group having a carbon number of 2-10 or a phenylene group.

6. A pneumatic tire according to any one of claims 1 and 3, wherein the rubber composition further contains a cobalt salt of an organic acid in an amount as cobalt content of 0.03-1 part by mass based on 100 parts by mass of the rubber component.

7. A pneumatic tire according to any one of claims 1 and 3, wherein the rubber component is at least one of natural rubber and polyisoprene rubber.

8. A pneumatic tire according to any one of claims 1 and 3, wherein the rubber component comprises not less than 50% by mass of natural rubber and the reminder being the synthetic rubber.

* * * * *